United States Patent
Liu et al.

(10) Patent No.: US 10,345,945 B2
(45) Date of Patent: Jul. 9, 2019

(54) DISPLAY PANEL AND PRESSURE SENSING METHOD FOR THE SAME

(71) Applicants: BOE Technology Group Co., Ltd., Beijing (CN); Beijing BOE Optoelectronics Technology Co., Ltd., Beijing (CN)

(72) Inventors: Yingming Liu, Beijing (CN); Xue Dong, Beijing (CN); Hailin Xue, Beijing (CN); Xiaochuan Chen, Beijing (CN); Haisheng Wang, Beijing (CN); Xiaoliang Ding, Beijing (CN); Shengji Yang, Beijing (CN); Weijie Zhao, Beijing (CN); Lei Wang, Beijing (CN); Ming Yang, Beijing (CN); Changfeng Li, Beijing (CN); Wei Liu, Beijing (CN); Pengpeng Wang, Bejing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 71 days.

(21) Appl. No.: 15/504,080

(22) PCT Filed: Sep. 9, 2016

(86) PCT No.: PCT/CN2016/098503
§ 371 (c)(1),
(2) Date: Feb. 15, 2017

(87) PCT Pub. No.: WO2017/118074
PCT Pub. Date: Jul. 13, 2017

(65) Prior Publication Data
US 2018/0107321 A1    Apr. 19, 2018

(30) Foreign Application Priority Data
Jan. 4, 2016 (CN) .......................... 2016 1 0004907

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0412* (2013.01);
(Continued)

(58) Field of Classification Search
None
See application file for complete search history.

(56) References Cited

U.S. PATENT DOCUMENTS

2012/0038558 A1   2/2012 Fergusson et al.
2014/0307186 A1*  10/2014 Yun ........................ G06F 3/045
                                                     349/12

(Continued)

FOREIGN PATENT DOCUMENTS

CN        103907081         7/2014
CN        105068695        11/2015
(Continued)

OTHER PUBLICATIONS

International Search Report for PCT/CN2016/098503 dated Nov. 10, 2016.
(Continued)

*Primary Examiner* — Joseph R Haley
*Assistant Examiner* — Emily J Frank
(74) *Attorney, Agent, or Firm* — Calfee, Halter & Griswold LLP

(57) ABSTRACT

The present disclosure provides a display panel and a pressure sensing method for the same, which belongs to the
(Continued)

field of pressure sensing technology for display panel, and can solve the problem that the existing pressure sensing technology for the display panel needs to change the overall structure of the display device and has poor accuracy. The display panel includes a first substrate and a second substrate, which are opposed to each other; a constant voltage electrode, which is applied with a constant voltage, and disposed on one of the first substrate and the second substrate; and a pressure sensing electrode, which is disposed to be opposite to the constant voltage electrode, configured to sense a pressure applied on the display panel in accordance with a distance thereof from the constant voltage electrode, and disposed on the other one of the first substrate and the second substrate.

9 Claims, 2 Drawing Sheets

(52) U.S. Cl.
CPC .. *G06F 3/0416* (2013.01); *G06F 2203/04105* (2013.01); *G06F 2203/04107* (2013.01); *G06F 2203/04112* (2013.01)

(56) References Cited

U.S. PATENT DOCUMENTS

| | | | | |
|---|---|---|---|---|
| 2015/0193033 A1* | 7/2015 | Westhues | ............... | G06F 3/0412 345/173 |
| 2017/0139513 A1* | 5/2017 | Hong | ................... | G02B 26/005 |

FOREIGN PATENT DOCUMENTS

| | | |
|---|---|---|
| CN | 105093622 | 11/2015 |
| CN | 105117058 A | 12/2015 |
| CN | 105144043 A | 12/2015 |
| CN | 105183257 A | 12/2015 |
| CN | 204904244 U | 12/2015 |
| CN | 204926053 | 12/2015 |
| CN | 105607356 | 5/2016 |
| CN | 205281077 | 6/2016 |

OTHER PUBLICATIONS

First Office Action for Chinese Patent Application No. 201610004907.4 dated Apr. 28, 2018.

* cited by examiner

DISPLAY PANEL AND PRESSURE SENSING METHOD FOR THE SAME

CROSS REFERENCE

The present application is a US national phase of PCT Application No. PCT/CN2016/098503 filed on Sep. 9, 2016, which is based upon and claims priority to Chinese Patent Application No. 201610004907.4, filed on Jan. 4, 2016, and the entire contents thereof are incorporated herein by reference.

TECHNICAL FIELD

The present disclosure relates to the field of pressure sensing technology for display panel, and more particularly to a display panel and a pressure sensing method for the same.

BACKGROUND

With the development of the technology, it is desired that not only a display panel (such as a liquid crystal display panel) can realize a touch function, but also a pressure (force touch) applied thereto can be sensed, such that a user can apply different pressures to the display panel for different operations, making the operation more convenient and improving the user experience.

The existing display panel is generally provided in a display device such as a mobile phone, and the display device further includes a frame, a backlight, and the like. However, the existing structure for sensing a pressure applied on the display panel is generally provided in a frame (such as a middle frame), a backlight, etc., to detect the pressure applied on the display panel as a whole or a displacement caused by the pressure.

However, the above design requires a change in the overall structure of the display device, which has a large influence on the original design and is difficult to be achieved. There is inevitably a certain assembling tolerance when mounting the display panel into the display device, which may affect the result of the pressure detection and limit the accuracy of the detection.

SUMMARY

In view of the problem that the existing pressure sensing technology for the display panel needs to change the overall structure of the display device and has poor accuracy, the present disclosure provides a display panel which does not change the overall structure of the display device and has better accuracy, and a pressure sensing method for the same.

According to a first aspect of the present disclosure, there is provided a display panel, including:
  a first substrate and a second substrate, which are opposed to each other;
  a constant voltage electrode, which is applied with a constant voltage, and disposed on one of the first substrate and the second substrate; and
  a pressure sensing electrode, which is disposed to be opposite to the constant voltage electrode, configured to sense a pressure applied on the display panel in accordance with a distance thereof from the constant voltage electrode, and disposed on the other one of the first substrate and the second substrate.

Optionally, the display panel further includes a touch detection electrode for detecting a touch, which is disposed between the first substrate and the second substrate, wherein the constant voltage electrode is disposed at a side of the second substrate facing toward the first substrate, and the pressure sensing electrode is disposed at a side of the first substrate facing toward the second substrate.

Optionally, the constant voltage electrode is grounded.

Optionally, the display panel further includes a plurality of pixels for displaying, wherein the constant voltage electrode and the pressure sensing electrode are located at intervals between the pixels.

Optionally, the display panel further includes a common electrode and a pixel electrode disposed at a side of the first substrate facing toward the second substrate, wherein the pressure sensing electrode is disposed at a position on the first substrate where the common electrode and the pixel electrode are not disposed.

Further optionally, the pressure sensing electrode is disposed in the same layer as the pixel electrode or the common electrode, and is separated from the pixel electrode or the common electrode.

Further optionally, the common electrode is a plate-shaped electrode, the pixel electrode is a slit electrode and farther from the first substrate than the common electrode, and the common electrode and the pixel electrode are separated by an insulating layer. At least part of the common electrode is simultaneously used as the touch detection electrode.

Further optionally, the constant voltage electrode is formed by a metallic material.

Further optionally, the common electrode is disposed in all the pixels and at intervals between a part of the pixels, and the common electrode is not disposed at intervals between the remaining pixels. The constant voltage electrode and the pressure sensing electrode are disposed at intervals between the pixels where the common electrode is not disposed. A floating additional electrode is further disposed at intervals between the pixels where the common electrode is disposed, and the additional electrode is disposed at a side of the second substrate facing toward the first substrate and is formed by the same metallic material as that of the constant voltage electrode.

According to another aspect of the present disclosure, there is provided a pressure sensing method for a display panel, wherein the display panel is the display panel described as above, the pressure sensing method for the display panel includes:
  determining the pressure applied on the display panel by analyzing a sensing signal generated by the pressure sensing electrode.

Optionally, as for the display panel in which the pressure sensing electrode and the constant voltage electrode are positioned at intervals between pixels, the pressure sensing electrode is positioned above a wire between pixels. The determining the pressure applied on the display panel by analyzing the sensing signal generated by the pressure sensing electrode includes: applying a high frequency signal to the pressure sensing electrode, while applying a same high frequency signal to the wire below the pressure sensing electrode; and determining the pressure applied on the display panel by analyzing the sensing signal fed back by the pressure sensing electrode.

In the display panel of the present disclosure, the pressure detection is achieved by the constant voltage electrode and the pressure sensing electrode disposed inside of the display panel, thus it does not require a change in the overall structure of the display device. Moreover, the pressure applied on the display panel is detected by detecting small change in a distance between the two substrates (i.e. In Cell detection), and thus the detection result is not affected by the assembly tolerance and the accuracy is high.

DETAILED DESCRIPTION

In order that those skilled in the art will better understand the technical solutions of the present disclosure, the present disclosure will be described in further detail with reference to the accompanying drawings and detailed description.

Figure 1:
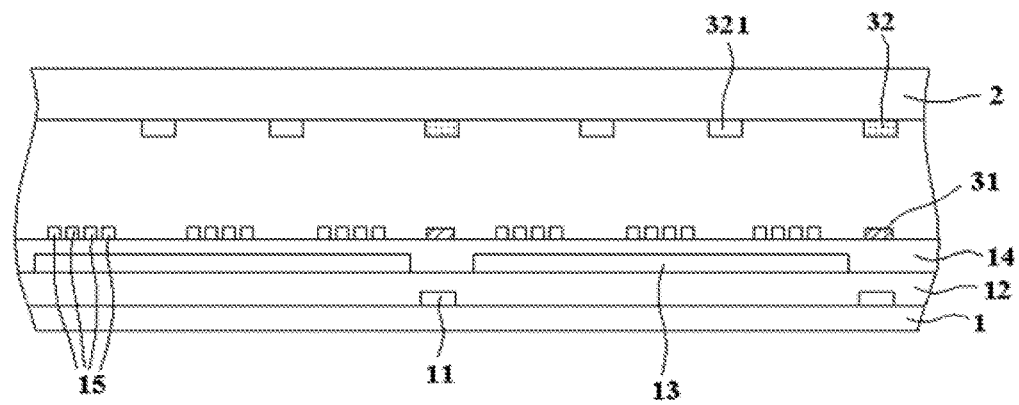
FIG. 1 is a partial cross-sectional view of a display panel according to an embodiment of the present disclosure.
Figure 2:
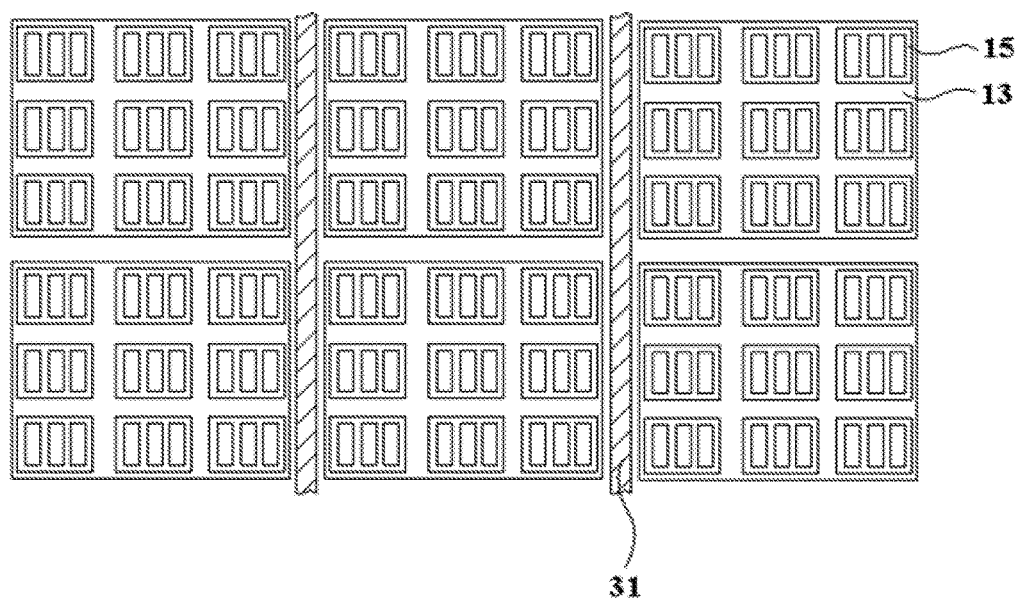
FIG. 2 is a partial plan view of the electrode arrangement in an array substrate of a display panel according to an embodiment of the present disclosure.
Figure 3:
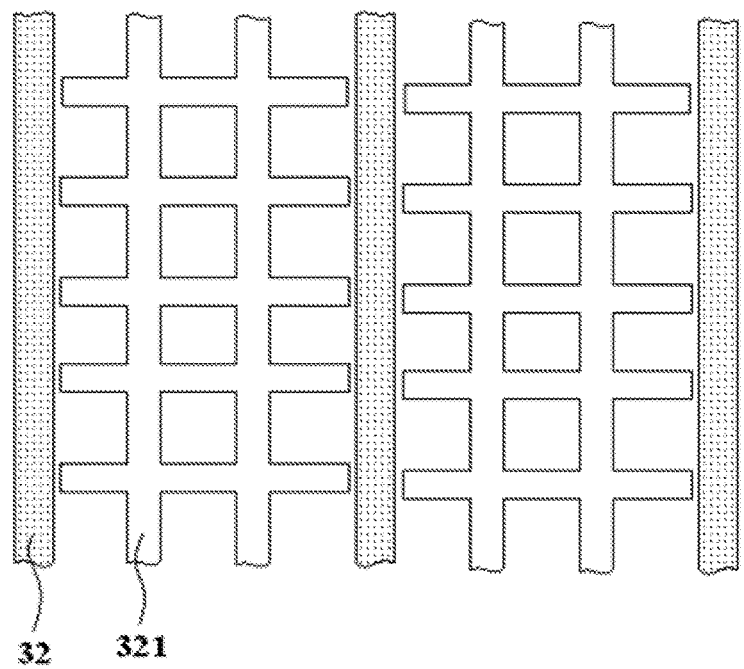
FIG. 3 is a partial plan view of the electrode arrangement in a color film substrate of a display panel according to an embodiment of the present disclosure.

An embodiment of the present disclosure provides a display panel. As shown in FIGS. 1 to 3, the display panel includes:

a first substrate and a second substrate, which are opposed to each other;

a constant voltage electrode 32, which is applied with a constant voltage and disposed on one of the first substrate and the second substrate; and a pressure sensing electrode 31, which is disposed to be opposite to the constant voltage electrode 32, configured to sense a pressure applied on the display panel in accordance with a distance thereof from the constant voltage electrode 32, and disposed on the other one of the first substrate and the second substrate.

That is, as shown in FIG. 1, the present embodiment provides a display panel for displaying, which is formed by two substrates (such as a color film substrate 2 and an array substrate 1) opposed to each other. Further, the constant voltage electrode 32 and the pressure sensing electrode 31 are disposed between the two substrates to be opposed to each other, and a pair of constant voltage electrode 32 and pressure sensing electrode 31 disposed to be opposed to each other may form a capacitor. When a user applies a pressure to the second substrate, the second substrate undergoes slight deformation under the pressure, and a distance between the two electrodes changes, resulting in a corresponding change in capacitance. Therefore, the distance between the two substrates can be obtained by detecting the above capacitance value, that is, the pressure applied on the substrate is obtained, to achieve the touch sensing and pressure sensing of In cell.

A touch detection electrode for detecting touch may be disposed between the two substrates, and thus the touch sensing can be achieved. In addition, the constant voltage electrode 32 is disposed at a side for receiving the touch (for example, disposed on the color film substrate 2), thus the influence of the capacitance of the user's finger on the detection can be shielded to more accurately obtain the pressure applied on the substrate. In this case, the constant voltage electrode 32 is disposed at a side of the second substrate facing toward the first substrate. The pressure sensing electrode 31 is disposed at a side of the first substrate facing toward the second substrate.

In the display panel of the present embodiment, the constant voltage electrode 32 and the pressure sensing electrode 31 for detecting pressure are positioned inside of the display panel, thus there is no need to change the overall structure of the display device. Moreover, in the display panel of the present embodiment, the pressure is detected by detecting change in the distance between the two substrates (i.e. In Cell detection), and thus the detection result is not affected by the assembly tolerance and the accuracy is high.

The pressure sensing electrode 31 (and the corresponding constant voltage electrode 32) may be provided at a relatively large distance (e.g., several millimeters or several centimeters) in the display panel, since pressure sensing does not require a high positional accuracy as touch sensing. Further, each of the pressure sensing electrodes 31 may be formed in a strip shape and have a larger length, for example, may be disposed to penetrate through the first substrate (i.e., from one side to the other side of the first substrate), so as to be directly connected to the corresponding chip. That is, the pressure sensing electrode 31 may function as a signal transmission line. Of course, the pressure sensing electrode 31 may not necessarily be directly connected to the corresponding chip, and may be connected to the chip by an additional wire.

It will be appreciated that, in the present disclosure, the pressure sensing electrode 31 is disposed to be opposite to the constant voltage electrode 32 (i.e., the projections thereof on the first substrate or the second substrate are at least partially overlapped). Thus although the distribution and the shape of the pressure sensing electrode 31 are mainly described above, the constant voltage electrode 32 may have a similar distribution and shape. Although the constant voltage electrode 32 needs only a fixed voltage to shield the capacitance of the finger and forms a capacitance with the pressure sensing electrode 31, the constant-voltage electrode 32 is preferably grounded from the viewpoint of simplicity and avoidance of influence on other structures.

The display panel may include a plurality of pixels for displaying, and the constant voltage electrode 32 and the pressure sensing electrode 31 may be disposed at intervals between the pixels in order to minimize the influence of the constant voltage electrode 32 and the pressure sensing electrode 31 on the displaying.

The side of the first substrate facing toward the second substrate may be provided with a common electrode 13 and a pixel electrode 15. In this case, the pressure sensing electrode 31 may be disposed at a position on the first substrate where the common electrode 13 and the pixel electrode 15 are not disposed, to ensure that it can play a role in detection without affecting the displaying. In other words, the pressure sensing electrode 31 is disposed such that the projection of the pressure sensing electrode 31 on the first substrate does not overlap with the projection of the common electrode 13 and the pixel electrode 15 on the first substrate. Since the pixel electrode 15 and the common electrode 13 are included in each pixel, the pressure sensing electrode 31 and the constant voltage electrode 32 are preferably provided at intervals between the pixels.

It is to be understood that in the display panel provided by the present disclosure, as shown in FIG. 1, the first substrate may be an array substrate 1, and the second substrate may be a color film substrate 2.

The pressure sensing electrode 31 may be disposed in the same layer as the pixel electrode 15 or the common electrode 13, and may be separated from the pixel electrode 15 or the common electrode 13.

In order to simplify the process, the pressure sensing electrode 31 may be formed in the same patterning process (that is, in the same layer arrangement) from the same material layer as the other structures. Since the pixel electrode 15 and the common electrode 13 do not have to be disposed between the pixels, the pressure sensing electrode 31 may be provided in the same layer as the pixel electrode 15 or the common electrode 13 (the same layer as the pixel electrode 15 in the drawing). Of course, it is also ensured that the pressure sensing electrode 31 cannot be connected to the electrode of the same layer.

The common electrode 13 may be a plate-shaped electrode. The pixel electrode 15 may be a slit electrode and farther from the first substrate than the common electrode 13. The common electrode 13 and the pixel electrode 15 are separated by an insulating layer 14. In this case, at least part of the common electrode 13 may be used as the touch detection electrode.

As shown in FIGS. 1 and 2, the common electrode 13 is a plate-shaped electrode. The pixel electrode 15 is a slit electrode. The pixel electrode 15 is positioned above the common electrode 13. Further, each common electrode 13 (for example, 5 mm×5 mm in size) may correspond to a plurality of pixels. In this case, each common electrode 13 may be used as a self-capacitance type touch electrode in a time-multiplexed (shared) manner. That is, a common voltage is supplied to each common electrode 13 during a period of displaying. A high frequency signal is supplied to each common electrode 13 and a feedback signal thereof is detected during a period of touch sensing. When a user's finger comes near the common electrode 13, the self-capacitance of the common electrode 13 changes and the feedback signal changes, such that the touch position can be determined by the change of the feedback signal. Since it is known that the above common electrode 13 is also used as a touch electrode at the same time, it will not be described in detail herein.

Further, the constant voltage electrode 32 may be formed by a metallic material. Since the common electrode 13 and the pixel electrode 15 are positioned on the first substrate (for example, for ADS mode or IPS mode display panel). Since the second substrate is not provided with any other conductive structure other than the constant voltage electrode 32 thereon, the constant voltage electrode 32 can be made of a metallic material (including an alloy) having a lower resistance in order to reduce its resistance.

When the common electrode 13 is disposed in all the pixels and at intervals between a part of the pixels (the common electrode 13 is not disposed at intervals between the remaining pixels), and the pressure sensing electrode 31 and the constant voltage electrode 32 are disposed at intervals between the pixels where the common electrode 13 is not disposed, a floating additional electrode 321 may be further disposed at intervals between the pixels where the common electrode 13 is disposed, and the additional electrode 321 is disposed at a side of the second substrate facing toward the first substrate and is formed by the same metallic material as that of the constant voltage electrode 32.

As shown in FIGS. 2 and 3, each of the pixels includes a common electrode 13. Since the common electrode 13 is a plate-shaped electrode, it can also cover the intervals between a part of pixels (i.e., each common electrode 13 covers a plurality of pixels). The pressure sensing electrode 31 and the constant voltage electrode 32 may be provided at a portion that is not covered by the adjacent common electrode 13 (i.e., the interval between adjacent common electrodes 13), such that the constant voltage electrode 32 is provided only at intervals between a part of pixels. Since the constant voltage electrode 32 is formed by the metallic material, although it is disposed between the pixels (for example, at the black matrix), the constant voltage electrode 32 may have a certain influence on the displaying of the adjacent pixels. If the constant voltage electrode 32 is disposed only at intervals between a part of pixels (i.e., those intervals without the common electrode 13), there may be a difference in the display effect between the pixels having the constant voltage electrodes 32 therebetween and the pixels having no constant-voltage electrodes 32 therebetween, that is, causing the display panel to display unevenly. In order to alleviate this unevenness, the additional electrode 321 formed by the same material as that of the constant voltage electrode 32 may be provided at intervals between the pixels where the common electrodes 13 are provided (i.e., at intervals between the pixels where the constant voltage electrodes 32 are not provided) (obviously, may be in the same layer as the constant voltage electrode 32). The additional electrode 321 and the constant voltage electrode 32 form a structure similar to a "metal mesh" as shown in FIG. 3. In this case, since the touch electrode (common electrode 13) may be covered by the additional electrode 321, the additional electrode 321 floats and is disconnected from the constant voltage electrode 32 from each other to prevent the additional electrode 321 from blocking the touch signal of the finger.

It is to be understood that a gate line, a gate insulating layer, a data line 11, a passivation layer 12, a common electrode line, an active region, a source electrode, a drain electrode, a polarizer, an alignment layer, a color filter films, a black matrix, a spacer, and the like may be further disposed on the array substrate 1 and the color film substrate 2, which are not described in detail again herein.

The display panel provided by the present disclosure may be a liquid crystal display panel, an organic light emitting diode (OLED) display panel, or the like, and may employ an ADS (advanced super dimension switch) mode, an IPS (in plane switching) mode, or a TN (twisted nematic) mode.

Of course, it is to be understood that although the display panel in which the common electrode 13 is also used as the touch electrode in the present embodiment is taken as an example, the present disclosure is not limited thereto. For example, the position and form of the common electrode 13 and the pixel electrode 15 may be interchanged. For example, the touch electrode may be used separately with the common electrode 13, and may be a single structure. For example, the touch electrode may be of a mutual capacitance type (i.e., divided into a canning electrode and a sensing electrode), etc.; and this will be no longer described in detail here.

An embodiment of the present disclosure provides a pressure sensing method for a display panel, wherein the display panel is the display panel described as above, and the pressure sensing method for the display panel includes: determining the pressure applied on the display panel by analyzing a sensing signal generated by the pressure sensing electrode.

With the display panel described as above, when a touch occurs, the second substrate may be deformed due to the pressure, such that the distance between the pressure sensing electrode and the constant voltage electrode changes, and capacitance therebetween also changes. Thus the sensing signal generated by the pressure sensing electrode also changes, and the pressure applied on the display panel can be obtained by analyzing the sensing signal.

When the pressure sensing electrode and the constant voltage electrode in the display panel are positioned at intervals between the pixels, the pressure sensing electrode may be positioned above the wire between the pixels. In this case, the above process of determining the pressure applied on the display panel by analyzing the sensing signal generated by the pressure sensing electrode includes: applying a high frequency signal to the pressure sensing electrode, while applying a same high frequency signal to the wire below the pressure sensing electrode; and determining the pressure applied on the display panel by analyzing the sensing signal fed back by the pressure sensing electrode.

Figure 4:
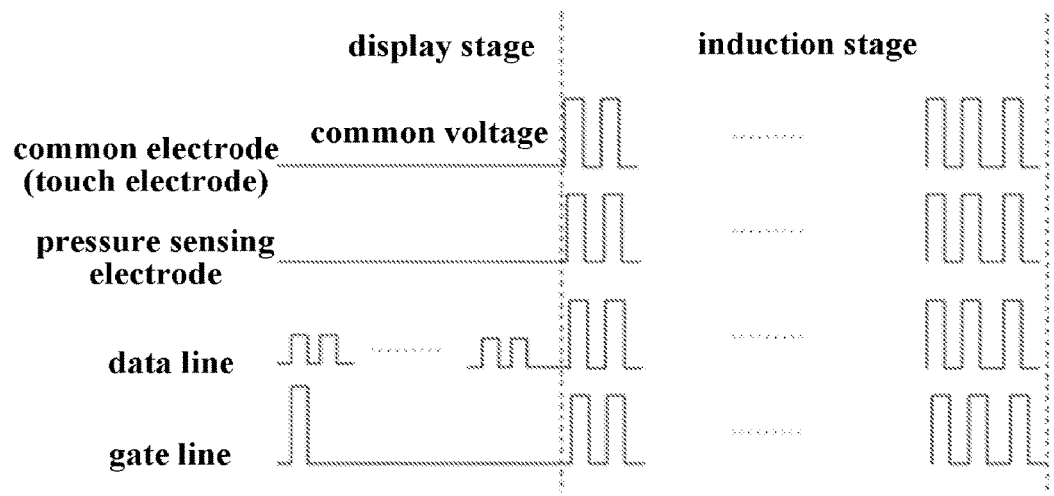
FIG. 4 is a schematic diagram showing a driving timing of a display panel according to an embodiment of the present disclosure.

It will be appreciated by those skilled in the art that better detection accuracy may be obtained if a high frequency signal is applied to the pressure sensing electrode and the feedback thereof is used as the sensing signal. However, when the pressure sensing electrode and the constant voltage electrode are positioned at intervals between the pixels, the pressure sensing electrode may be located above the wire (for example, gate line, data line, etc.), such that signals therein (particularly, the high frequency signal) may be affected by a signal in the wire. Regarding this, a high frequency signal similar to the high frequency signal applied to the pressure sensing electrode is applied to each wire during the pressure detection to eliminate the influence on the sensing electrode. For example, the operation can be divided into a display stage and an induction stage for the case that the common electrode and the touch electrode are commonly used. The pressure detection can be performed in the induction stage to reduce the time required for the detection. That is, as shown in FIG. 4, in the induction phase, the common electrode, the pressure sensing electrode and the wire are all applied with a high frequency signal. The touch position is determined by the signal fed back by the common electrode. The pressure applied on the display panel is determined by the signal fed back by the pressure sensing electrode.

It is to be understood that the above embodiments are merely exemplary embodiments employed for the purpose of illustrating the principles of the present disclosure, but the present disclosure is not limited thereto. It will be apparent to those skilled in the art that various changes and modifications can be made therein without departing from the spirit and spirit of the present disclosure, and such changes and modifications are also regarded to be within the scope of the present disclosure.

What is claimed is:

1. A display panel, comprising:
    a first substrate and a second substrate, which are opposed to each other;
    a constant voltage electrode, which is applied with a constant voltage, and disposed on one of the first substrate and the second substrate; and
    a pressure sensing electrode, which is disposed to be opposite to the constant voltage electrode, configured to sense a pressure applied on the display panel in accordance with a distance thereof from the constant voltage electrode, and disposed on the other one of the first substrate and the second substrate;
    the display panel further comprising:
    a common electrode and a pixel electrode positioned at a side of the first substrate facing toward the second substrate, wherein the pressure sensing electrode is disposed at a position on the first substrate where the common electrode and the pixel electrode are not disposed.

2. The display panel of claim 1, wherein the pressure sensing electrode is disposed in the same layer as the pixel electrode or the common electrode, and is separated from the pixel electrode or the common electrode.

3. The display panel of claim 1, wherein,
    the common electrode is a plate-shaped electrode, the pixel electrode is a slit electrode and farther from the first substrate than the common electrode, and the common electrode and the pixel electrode are separated by an insulating layer; and
    at least part of the common electrode is simultaneously used as the touch detection electrode.

4. The display panel of claim 3, wherein,
    the common electrode is disposed in all the pixels and at intervals between a part of the pixels, and the common electrode is not disposed at intervals between the remaining pixels;
    the constant voltage electrode and the pressure sensing electrode are disposed at intervals between the pixels where the common electrode is not disposed; and
    a floating additional electrode is further disposed at intervals between the pixels where the common electrode is disposed, and the additional electrode is disposed at a side of the second substrate facing toward the first substrate and is formed by the same metallic material as that of the constant voltage electrode.

5. The display panel of claim 1, wherein the constant voltage electrode is formed by a metallic material.

6. A pressure sensing method for the display panel of claim 1, comprising:
    determining the pressure applied on the display panel by analyzing a sensing signal generated by the pressure sensing electrode.

7. The pressure sensing method for the display panel of claim 6, wherein the pressure sensing electrode is disposed in the same layer as the pixel electrode or the common electrode, and is separated from the pixel electrode or the common electrode.

8. The pressure sensing method for the display panel of claim 6, wherein,
    the common electrode is a plate-shaped electrode, the pixel electrode is a slit electrode and farther from the first substrate than the common electrode, and the common electrode and the pixel electrode are separated by an insulating layer; and
    at least part of the common electrode is simultaneously used as the touch detection electrode.

9. The pressure sensing method for the display panel of claim 8, wherein,
    the common electrode is disposed in all the pixels and at intervals between a part of the pixels, and the common electrode is not disposed at intervals between the remaining pixels;
    the constant voltage electrode and the pressure sensing electrode are disposed at intervals between the pixels where the common electrode is not disposed; and
    a floating additional electrode is further disposed at intervals between the pixels where the common electrode is disposed, and the additional electrode is disposed at a side of the second substrate facing toward the first substrate and is formed by the same metallic material as that of the constant voltage electrode.

* * * * *